United States Patent [19]

Inoue et al.

[11] Patent Number: 4,897,741
[45] Date of Patent: Jan. 30, 1990

[54] SIGNAL RECORDING APPARATUS

[75] Inventors: Syuzi Inoue, Ora; Hideki Osawa, Fukaya; Nobumasa Nakagawa, Ota, all of Japan

[73] Assignee: Sanyo Electric Co., Ltd., Osaka, Japan

[21] Appl. No.: 140,687

[22] Filed: Jan. 4, 1988

[30] Foreign Application Priority Data

Jan. 7, 1987 [JP] Japan .................................. 62-1272
Jan. 8, 1987 [JP] Japan .................................. 62-2121
Jan. 13, 1987 [JP] Japan .................................. 62-5249
Jan. 13, 1987 [JP] Japan .................................. 62-5250
Feb. 5, 1987 [JP] Japan .................................. 62-25358

[51] Int. Cl.$^4$ ........................... G11B 5/02; G11B 5/00
[52] U.S. Cl. ............................................ 360/64; 360/7
[58] Field of Search .......................... 360/7, 32, 69, 71

[56] References Cited

U.S. PATENT DOCUMENTS 4,633,331 12/1986 McGrady et al. ...................... 360/7
4,665,443 5/1987 Tanaka .................................... 360/7

FOREIGN PATENT DOCUMENTS 56-433 1/1981 Japan .
59-19202 1/1984 Japan .

Primary Examiner—Vincent P. Canney
Attorney, Agent, or Firm—Armstrong, Nikaido, Marmelstein, Kubovcik & Murray

[57] ABSTRACT

A signal recording apparatus comprising the operation portion to be manipulated when it is found necessary to record a signal on a recording medium while the signal is being produced, a signal conversion circuit for converting the signal to a digital signal, a memory circuit of specified capacity for temporarily storing the digital signal from the conversion circuit and thereafter feeding the signal to a signal recording head, and a main control circuit for controlling the memory circuit for storing the signal therein and reading out the signal therefrom. In response to a recording start instruction given by the operation portion, a system for driving the recording medium is initiated into operation, and at the same time, the signal is read out from the memory circuit retroactively since a predetermined time interval prior to the manipulation of the operation portion and is recorded on the medium.

4 Claims, 5 Drawing Sheets

SIGNAL RECORDING APPARATUS

FIELD OF THE INVENTION

The present invention relates to signal recording apparatus such as autio tape recorder, video tape recorder and optical disc recording apparatus, and more particularly to an apparatus comprising a memory circuit for temporarily storing a recorded signal, which is then read out and recorded on a recording medium by a recording head.

When what is discussed in a conference is to be recorded using a tape recorder having a magnetic tape as a signal recording medium, a sufficiently long magnetic tape is required if it is attempted to record the speech over the entire period of the conference from start to end. It is likely that the magnetic tape will not be long enought to record the entire conference. Further when the tape is played back after the recording to take notes of the speech, there is a need to play the tape for the same period of time required for recording. Since the tape contains voiceless portions or signal portions of which there is no need to take notes, the reproduction of these portions leads to a waste of time.

To overcome these problems, a tape recorder of the construction shown in FIG. 6 has been proposed (Examined Japanese utility model application SHO No. 56433).

The tape recorder comprises a recording signal generator 1 connected to a signal recording head 4 via a recording amplifier 13, which has an output terminal connected via a detection control circuit 50 to a drive system 6 including a tape transport motor. The control circuit 50 continuously feeds a drive instruction to the drive system 6 only while the output level of the amplifier 13 is above a predetermined level. Accordingly, when the output level of the amplifier 13 dips below the predetermined level upon an interruption of speech during a conference, the magnetic tape automatically stops. This precludes the likelihood that the tape will have a voiceless portion.

However, the tape recorder is merely so adapted that the magnetic tape stops during the interruption of speech and therefore still has the problem of necessitating much time for reproducing the signal since the recorded speech includes speech portions which it would be later found unnecessary to take notes of.

When the tape recorder is provided with a switch for quickly energizing and deenergizing the tape drive system, the user will turn on and off the switch during the conference to record the required speech portions only and thereby shorten the reproduction time. Nevertheless, the user then invariably turns on the switch upon hearing the necessary speech portion, with the resulting disadvantage that the beginning of the portion to be recorded can not be recorded.

SUMMARY OF THE INVENTION

The main object of the present invention is to provide a signal recording apparatus, such as a tape recorder, which comprises an operation portion to be manipulated when it is found necessary to record a voice or sound signal on a magnetic tape or like signal recording medium while the signal is being produced, and a memory circuit in which the signal to be recorded is stored at all times while being renewed. It is when the operation portion is manipulated that the recording medium is driven, and simultaneously with this, the signal is read out from the memory circuit retroactively since a predetermined time interval prior from the manipulation of the operation portion and is recorded on the medium, whereby the foregoing problems can be overcome.

With reference to FIG. 1, the signal recording apparatus of the invention comprises a generator 1 for producing a record signal, a signal conversion circuit 2 connected to the generator 1 for converting the signal to a digital signal, and a memory circuit 3 having a specified capacity and interposed between the signal conversion circuit 2 and a signal recording head 4 for storing the digital signal delivered from the conversion circuit 2.

The signal is written in and read from the memory circuit 3 under the control of a main control circuit 5. The digital signal is continuously written in the memory circuit 3 and continuously read out a predetermined storage period T (e.g. eight seconds) after the writing and fed to the recording head 4.

The apparatus includes a medium drive system 6 which is initiated into operation when an operation portion comprising an operation switch 7 or the like is turned on and is brought out of operation when the portion is turned off.

Accordingly, when the operation switch 7 is turned on promptly after the important signal portion to be recorded on the medium has been produced, the apparatus starts recording the signal since the predetermined time interval prior to the manipulation of the switch 7, i.e. prior to the recognition of the signal portion. Further while the signal being produced need not be recorded on the medium, the operation switch 7 is off, holding the drive system 6 out of operation. This precludes the medium from recording the unnecessary signal portion.

Thus, the signal recording apparatus of the invention is so adapted that only the signal portions which are found to be important by the user can all be recorded on the medium. Consequently, the signal can be reproduced without waste of time. The apparatus is therefore suited for recording discussions or lectures, or for editing recording if it is in the form of a video tape recorder.

BRIEF DESCRIPTION OF THE DRAWINGS

FIG. 6 is a block diagram showing a conventional apparatus.

DESCRIPTION OF THE PREFERRED EMBODIMENTS

FIGS. 2 to 5 show signal recording apparatus embodying the invention for use as audio tape recorders. These embodiments will be described below in detail.

Figure 1:
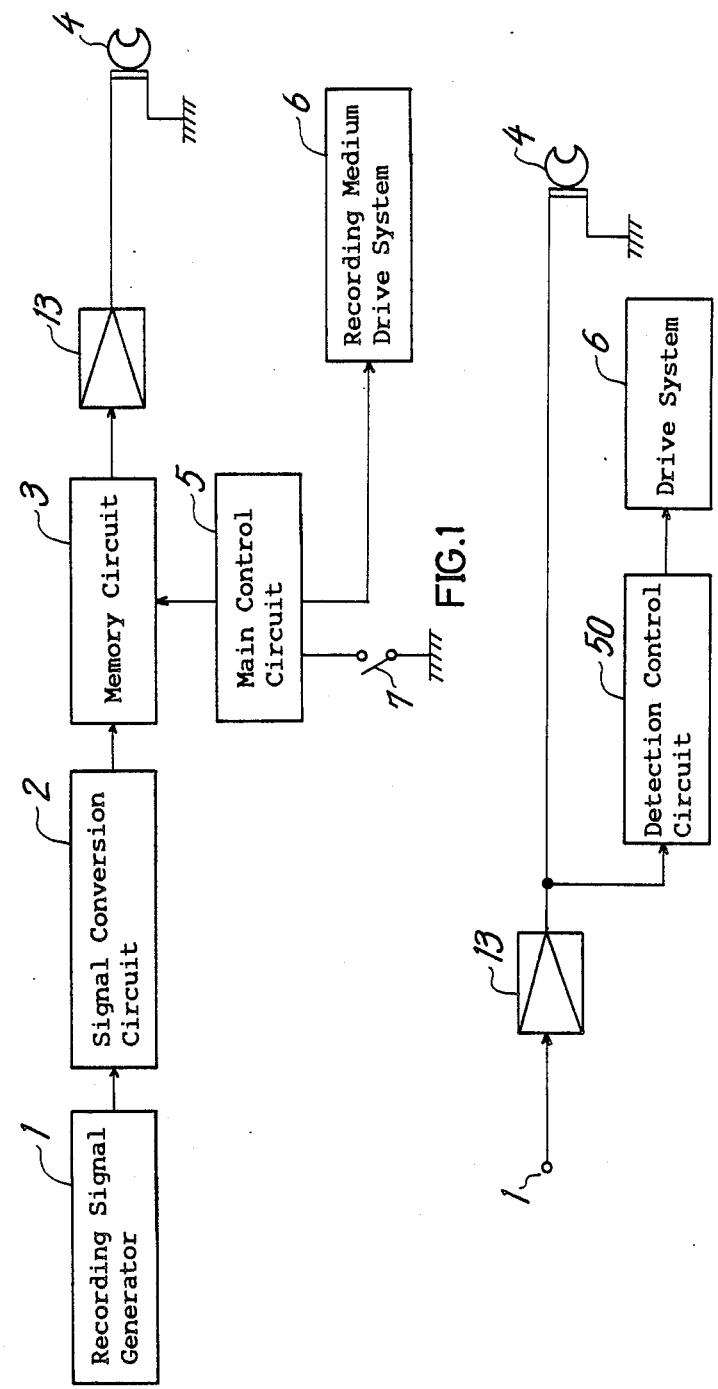
FIG. 1 is a block diagram showing the basic construction of signal recording apparatus of the invention.
Figure 2:
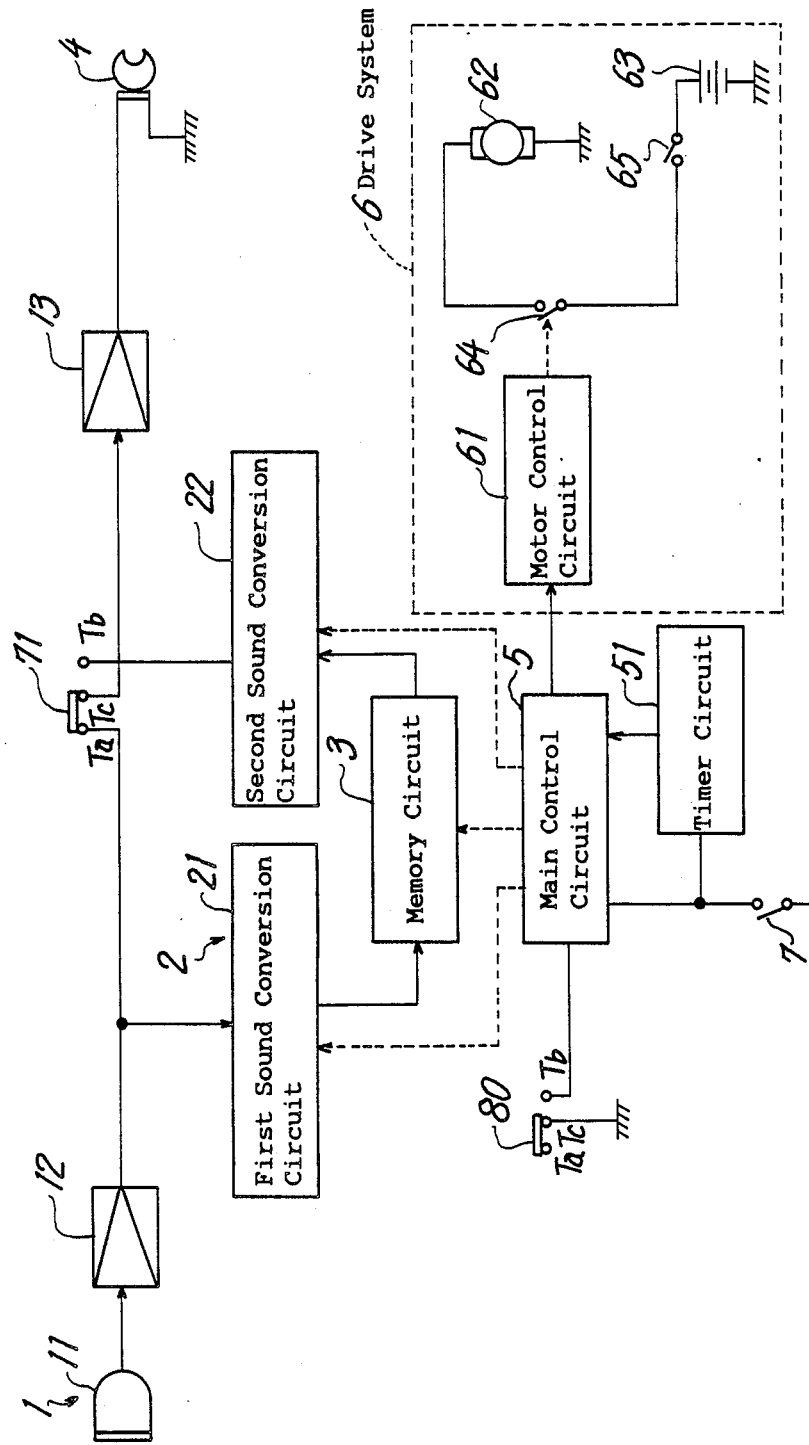
FIG. 2 is a block diagram showing a first embodiment of the invention.

(I) First Embodiment (FIG. 2)

The output end of a microphone 11 serving as a record signal generator is connected to a signal recording head 4 via a preamplifier 12, a selection switch 71 and a recording amplifier 13.

A system 6 for driving a signal recording medium, i.e. a magnetic tape, comprises a tape transport motor 62 coupled to a capstan (not shown) for transporting the tape at a constant speed, a power supply 63, a control switch 64 and a power supply switch 65 for opening or closing the circuit for supplying power to the motor, and a motor control circuit 61 for controlling the switch 64. The power switch 65 is so adapted as to be closed in operative relation with the depression of a record button or playback button.

The signal amplified by the preamplifier 12 is applied to a first sound conversion circuit 21 serving as a signal conversion circuit and is thereby converted to a digital signal, which is then fed to a memory circuit 3 controlled by a main control circuit 5 for storing and reading. The signal is read out from the memory circuit 3 and applied to a second sound conversion circuit 22, by which it is converted to the original analog signal, i.e. sound signal.

The memory circuit 3 comprises, for example, a RAM of 256 Kbits. The input data is stored in the memory at addresses of consecutively increasing number, and when the address of a maximum number is reached, the data is next stored at the address of minimum number repeatedly. The data is read out from the memory circuit 3 first at the address where data is to be written and is thereafter read out from address to address. Consequently, the digital signal from the first sound conversion signal 21 is continuously stored in the memory circuit 3, continuously read out a predetermined storage period T (about 8 seconds) after the writing and sent to the second sound conversion circuit 22.

The selection switch 71 interposed between the preamplifier 12 and the recording amplifier 13 includes a first input terminal Ta to which the output terminal of the preamplifier 12 is connected, a second input terminal Tb to which the output terminal of the second sound conversion circuit 22 is connected, and a common output terminal Tc to which the recording amplifier 13 is connected.

The main control circuit 5 has connected thereto an operation switch 7 serving as an operation portion, and a timer circuit 51 for setting a time delay D equal to the storage time interval T of the memory circuit 3. When the switch 7 is opened, the timer circuit 51 starts counting up the delay time D, continuing the application of a holding signal to the main control circuit 5 until the expiration of the delay time D, with the result that upon the lapse of the delay time D after the opening of the switch 7, the main control circuit 5 gives a deenergization instruction to the motor control circuit 61 to thereby open the control switch 64. The delay time D can be longer than the storage duration T.

The main control circuit 5 has connected thereto a coupled switch 80 operable as coupled to the selection switch 71. When the selection switch 71 is closed at the terminal Tb, the coupled switch 80 is also closed at its terminal Tb simultaneously therewith, whereby the main control circuit 5 is brought into a control mode for recording with use of the memory circuit 3 as will be described below (hereinafter referred to as "memory recording"), feeding a control signal to the motor control circuit 61 for opening the control switch 64.

The usual recording operation and the memory recording operation of the apparatus will be described below.

Usual Recording Operation

For the usual recording operation without using the memory circuit 3, the selection switch 71 is first closed at the terminal Ta as illustrated. With this, the coupled switch 80 is closed at the terminal Ta, closing the control switch 64.

When the tape recorder is set in the recording mode by depressing the recording button on the operation panel (not shown), the power switch 65 is closed, whereby the motor 62 is energized to transport the magnetic tape.

A sound signal is converted by the microphone 11 to an electric signal, which is then amplified by the preamplifier 12 and fed to the recording amplifier 13 via the selection switch 71. The signal from the amplifier is applied to the signal recording head 4 and is thereby recorded in the magnetic tape.

During the usual recording operation, the memory circuit 3 and the two sound conversion circuits 21, 22 are held out of operation.

Memory Recording Operation

For the memory recording operation, the selection switch 71 is closed at the terminal Tb, and the recorder is set in the recording mode. With the switch 71, the coupled switch 80 is closed at the terminal Tb, setting the main control circuit 5 in the control mode for memory recording and opening the control switch 64.

Under the control of the main control circuit 5, the memory circuit 3 and the two sound conversion circuits 21, 22 are brought into operation. The output signal from the preamplifier 12 is subjected to analog-digital conversion by the first sound conversion circuit 21. The digital signal from the first sound conversion circuit 21 is stored in the memory circuit 3. The signal stored in the circuit 3 is read out the predetermined period of time (8 seconds) thereafter and delivered to the second sound conversion circuit 22, by which the signal is subjected to digital-analog conversion. Consequently, the output signal from the preamplifier 12, as delayed by 8 seconds, is produced from the second sound conversion circuit 22 as a sound signal, which is then applied to the signal recording head 4 via the selection switch 71 and the recording amplifier 13.

At this time, the control switch 64 is open, holding the tape transport motor 62 unenergized and the tape at rest, without permitting the recording head 4 to record the signal.

When the speech portion to be noted down is found in this state during the conference, the user closes the operation switch 7 as quickly as possible, whereby the control switch 64 is closed, energizing the tape transport motor 62. As a result, the magnetic tape travels for the recording head 4 to record the signal on the tape. The sound signal portion recorded on the tape upon the manipulation of the operation switch 7 is not the one produced at this time but the one produced by the microphone 11, 8 seconds prior to this time, so that the speech portion heard by the user during the time interval of 8 seconds prior to the manipulation is to be recorded on the magnetic tape.

When it becomes unnecessary to record the signal thereafter, the user opens the operation switch 7, whereupon the timer circuit 51 starts counting up the delay time D (8 seconds), continuing to feed a holding signal to the main control circuit 5 until the lapse of 8 seconds and holds the control switch 64 closed during the delay time interval. Consequently, the magnetic tape travels for 8 seconds after the manipulation of the control switch 7. The whole signal that has been stored in the memory circuit 3 before the manipulation is therefore recorded on the tape.

On expiration of the 8-second interval, the main control circuit 5 gives a deenergization instruction to the motor control circuit 61, which in turn opens the control switch 64, stopping the tape and bringing the tape recorder in stand-by state without recording. In this state, the tape is at rest, whereas the memory circuit 3 and the two sound conversion circuits 21, 22 are in operation. Accordingly, when the operation switch 7 is closed as already stated, the important speech portions can all be recorded on the tape during the conference.

While the foregoing embodiment of the invention is designed specifically for recording, the second to fourth embodiments to be described below include a head 41 serving for recording and reproduction in place of the signal recording head 4 of the first embodiment. Thus, the invention is embodied as tape recorders which are adapted not only to record signals but also to reproduce signals. Throughout FIGS. 2 to 5, like parts are designated by like reference numerals and will not be described.

Figure 3:
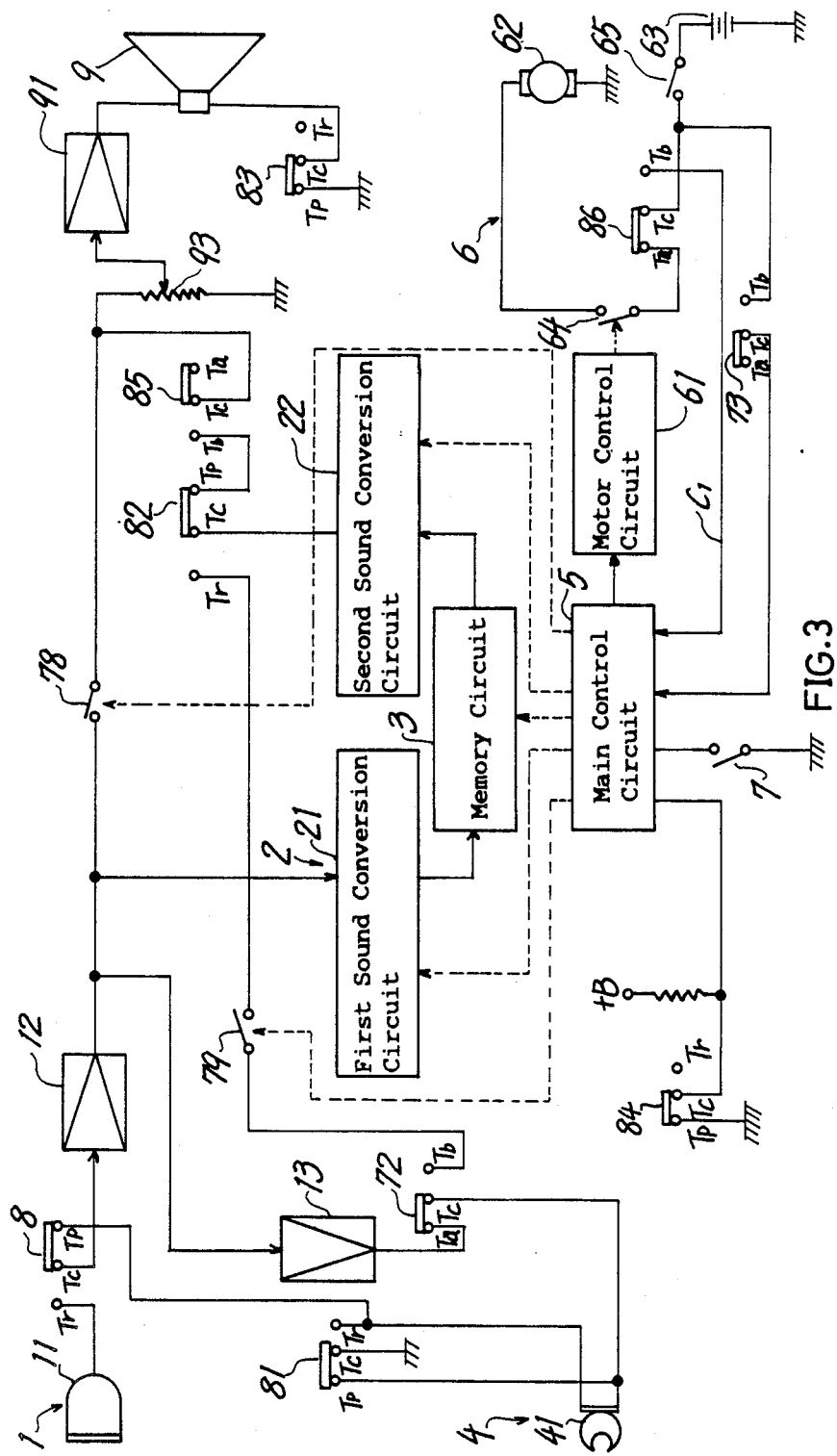
FIG. 3 is a block diagram showing a second embodiment of the invention.

(II) Second Embodiment (FIG. 3)

The output end of a microphone 11 is connected to a recording terminal Tr of a first recording-reproduction change switch 8. The switch has a common terminal Tc connected to a speaker 9 via a preamplifier 12, first control switch 78, variable resistor 93 and reproduction amplifier 91, the speaker serving as an external output device. The switch 8 further has a reproduction terminal Tp which is connected to a recording terminal Tr of a second recording-reproduction change switch 81. The switch 81 has a common terminal Tc which is grounded. The reproduction terminal Tp and a recording terminal Tr of the switch 81 are connected to the respective terminals of the recording-reproduction head 41.

The output terminal of the preamplifier 12 is connected via a recording amplifier 13 to a first input terminal Ta of a first selection switch 72. The switch 72 has a common output terminal Tc connected to the head 41.

A second sound conversion circuit 22 has an output terminal connected to a common terminal Tc of a third recording-reproduction change switch 82. The switch 82 has a reproduction terminal Tp connected to the input terminal of the variable resistor 93 through a first repeat/pause switch 85. The switch 82 has a recording terminal Tr connected to a second input terminal Tb of the first selection switch 72 via a second control switch 79.

One end of the signal terminal of the speaker 9 is connected to the output terminal of the reproduction amplifier 91, and the other end thereof to a common terminal Tc of a fourth recording-reproduction switch 83 having a grounded reproduction terminal Tp. When the tape recorder is in the recording mode, the change switch 83 cuts off the signal channel through the speaker 9, preventing the speaker 9 from giving off any sound and thereby precluding howling.

A main control circuit 5 has connected thereto a fifth recording-reproduction change switch 84 which is operated as associated with a mode change switch on the operation panel. The first and second control switches 78, 79 are controlled by the main control circuit 5. The main control circuit 5 has incorporated therein a timer circuit for counting up a storage duration T for a memory circuit 3.

With reference to a signal recording medium drive system 6, interposed between a control switch 64 and a power switch 65 is a second repeat/pause switch 86 which has a first terminal Ta connected to the control switch 64, a common terminal Tc connected to the power switch 65 and a second terminal Tb connected directly to the main control circuit 5. Via a second selection switch 73, the common terminal Tc is connected to the circuit 5.

The first to fifth recording-reproduction change switches 8, 81, 82, 83 and 84 are operatively connected to one another and are closed at the terminals Tr in the signal recording mode or at the terminals Tp in the signal reproduction mode. The first selection switch 72 is also operatively connected to the second selection switch 73, and the first repeat/pause switch 85 to the second repeat/pause switch 86.

The above apparatus operates as follows for usual reproduction, repeat reproduction, usual recording, memory recording and a change from usual reproduction to memory recording.

Usual Reproduction Operation

In the stop mode, the first to fifth recording-reproduction change switches 8, 81, 82, 83 and 84 are closed at the terminals Tp as illustrated, and the first control switch 78 and the control switch 64 are held closed.

When the apparatus is set in the reproduction mode from this state by manipulation on the operation panel, the power switch 65 is closed, supplying power to the tape transport motor 62 through the second repeat/pause switch 86 and the control switch 64 to initiate the magnetic tape into travel.

The signal reproduced from the tape by the recording-reproduction head 41 is passed through the first recording-reproduction change switch 8, the preamplifier 12 and the first control switch 78 and applied to the variable resistor 93, whereby the signal level is adjusted. Via the reproduction amplifier 91, the output signal from the resistor 93 is applied to the speaker 9, which gives off a sound.

Consequently, the signal reproduced from the magnetic tape is audible as a voice or sound. During the reproduction operation, the output signal of the preamplifier 12 is fed via the first sound conversion circuit 21 to the memory circuit 3 to renew the data in the memory circuit 3 with 8-second cycles as in the stand-by state of the first embodiment described.

Repeat Reproduction Operation

The tape recorder of the present embodiment can be set to a repeat reproduction mode wherein the speech the operator failed to hear can be reproduced again when noting down the recorded speech.

Repeat reproduction is conducted in the above usual reproduction mode, with the first and second repeat/pause switches 85, 86 closed at Tb. This deenergizes the tape transport motor 62, while a change signal $C_1$ is fed to the main control circuit 5, which in turn is set in a repeat reproduction control mode. Consequently, the first control switch 78 is opened, and the memory circuit 3 is held out of storing operation but is allowed to permit the data to be read out therefrom repeatedly.

The memory circuit 3 has stored therein the signal reproduced from 8 seconds in the past. The digital signal read out from the memory 3 is converted to an analog signal by the second sound conversion circuit 22. The analog signal is passed through the third recording-reproduction change switch 82, the first repeat/pause switch 85, the variable resistor 93 and the reproduction amplifier 91 and sent to the speaker 9, which in turn repeatedly produces a speech portion corresponding to the 8-second signal portion stored in the memory circuit 3. During the repeat reproduction operation, the tape recorder is temporarily at a stop with the tape at rest, whereas if the first and second repeat/pause switches 85, 86 are closed at Ta in this state, the tape starts traveling for the usual reproduction operation under the control of the main control circuit 5.

Usual Recording Operation

For the usual recording operation, the apparatus is set in the recording mode, with the first and second selection switches 72, 73 closed at Ta as illustrated, whereby the power switch 65 is closed, causing the tape to travel. At the same time, the first to fifth recording-reproduction change switches 8, 81, 82, 83 and 84 are closed at Tr.

The output signal from the microphone 11 is passed through the first recording-reproduction change switch 8, preamplifier 12, recording amplifier 13 and first selection switch 72 and fed to the recording-reproduction head 41, which records the signal on the magnetic tape. At this time, the signal channel through speaker 9 is broken by the fourth recording-reproduction change switch 83, so that no sound is produced from the speaker 9, thus precluding howling.

Memory Recording Operation

Memory recording is conducted by setting the apparatus in the usual recording mode after closing the first and second selection switches 72, 73 at Tb. This brings the main control circuit 5 into the control mode for memory recording, opening the power supply control switch 64 and closing the second control switch 79.

Further the memory circuit 3 and the two sound conversion circuits 21, 22 are brought into operation under the control of the main control circuit 5, with the result that the output signal of the preamplifier 12 is provided by the second sound conversion circuit 22, as delayed by 8 seconds as a sound signal. Via the third recording-reproduction change switch 82, second control switch 79 and first selection switch 72, this signal is applied to the recording-reproduction head 41.

At this time, the control switch 64 is open, with the magnetic tape at rest, so that no signal is recorded on the tape by the head 41.

If there is a speech portion desirable for noting down in this state during the conference, the operation switch 7 is closed as quickly as possible, whereby the control switch 64 is closed to energize the tape transport motor 62, consequently driving the tape and causing the head 41 to record the signal on the tape. The signal recorded contains the signal portion emitted during the 8-second time interval immediately prior to the closing the switch 7 as in the case of the first embodiment.

When it becomes unnecessary to record the speech thereafter, the operation switch 7 is opened about 8 seconds thereafter, whereby whole the signal that has been recorded in the memory circuit 3 before the switch manipulation is recorded on the tape.

Change from Usual Reproduction to Memory Recording

When the apparatus is set in the recording mode after closing the first and second selection switches 72, 73 at Tb and closing the operation switch 7 during the above usual reproduction operation, the apparatus can be changed over to memory recording directly from the condition for usual reproduction.

The above procedure closes the first to fifth recording-reproduction change switches 8, 81, 82, 83 and 84 at Tr, consequently setting the main control circuit 5 in the control mode for memory recording.

In this case, the second control switch 79 provided in the recording signal channel through the recording-reproduction head 41 is held open for 8 seconds after the change-over procedure under the control of the main control circuit 5. This eliminates the likelihood that the signal stored in the memory circuit 3 during the reproduction operation will be applied to the head 41. On lapse of the 8-second interval, the second control switch 79 is closed to start memory recording.

In either operation of usual recording and memory recording, the tape recorder can be temporarily stopped by closing the second repeat/pause switch 86.

When the second embodiment is changed over from reproduction operation to memory recording operation, the application of recording signal to the head is prevented for the same period of time as the storage duration T for the memory circuit 3, so that the signal stored in the memory circuit during reproduction will not be recorded on the tape, hence the advantage of assuring the change free of trouble.

In the above change procedure, the second control switch 79 may be held open for a longer period of time than the storage duration T of the memory circuit 3.

Figure 4:
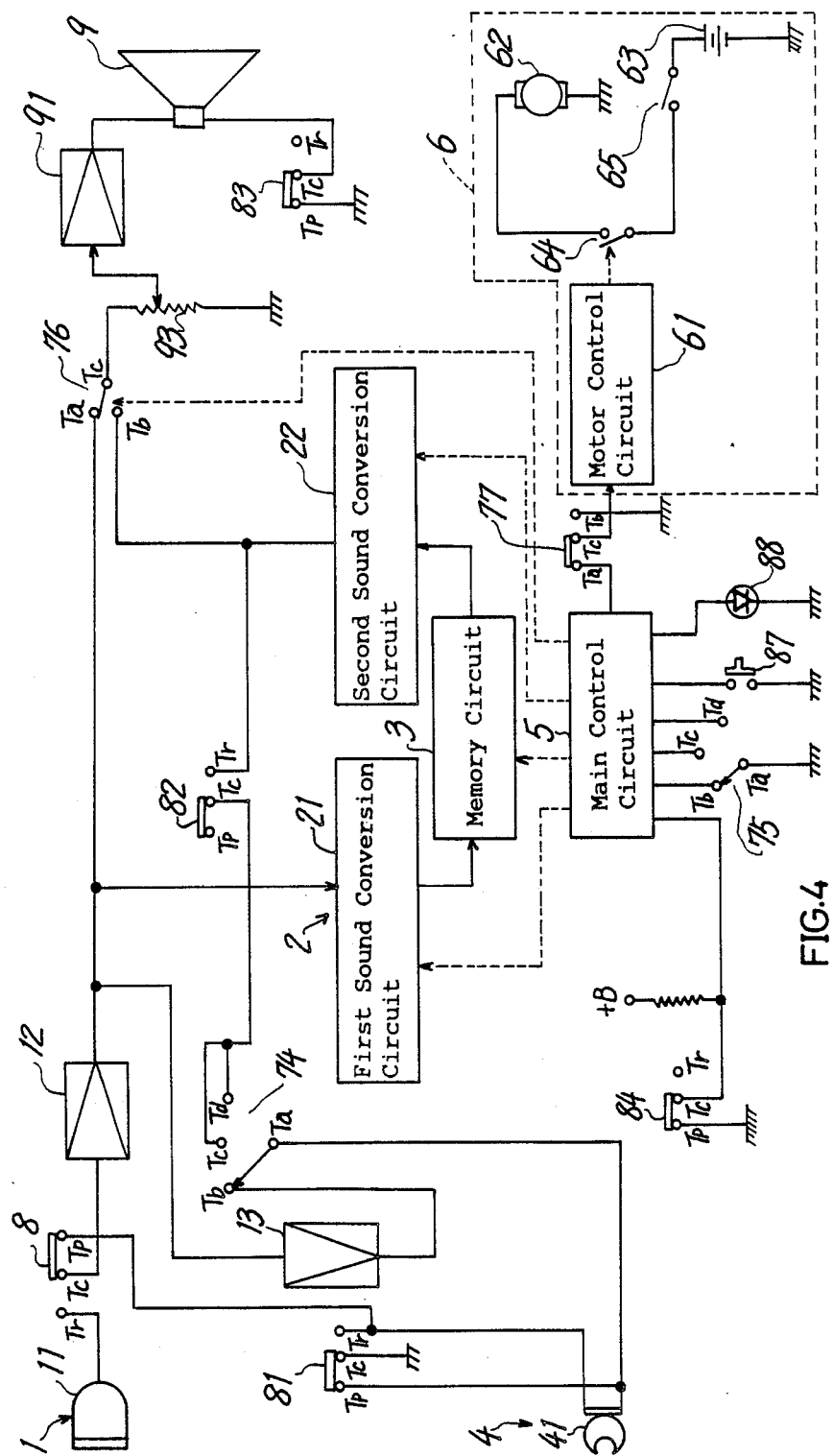
FIG. 4 is a block diagram showing a third embodiment of the invention.

(III) Third Embodiment (FIG. 4)

The third embodiment is generally similar to the second embodiment in circuit construction, but a control switch 76 controllable by the main control circuit 5 is interposed between the preamplifier 12 and the variable resistor 93. The switch 76 has an input terminal Tb connected to the recording-reproduction head 41 via a third recording-reproduction change switch 82 and a first selection switch 74. A second selection switch 75 having a grounded common terminal Ta is connected to the main control circuit 5.

The first and second selection switches 74, 75 are provided for repeat reproduction operation/nonoperation change and for long/short repeat time interval change for reproduction operation. For recording operation, these switches are provided for memory recording operation/nonoperation change and for long/short memory duration change. Each of these switches has a common terminal Ta, a first terminal Tb connected to the common terminal Ta when the apparatus are not in repeat reproduction or memory recording operation, a second terminal Tc to be connected to the common terminal Ta for short-interval repeat reproduction and memory recording, and a third terminal Td to be connected to the common terminal Ta for long-interval repeat reproduction and memory recording. The selection switches 74, 75 are operatively connected to each other.

A pause switch 77 is provided between the main control circuit 5 and the motor control circuit 61.

The switch 77 has a first terminal Ta and a common terminal Tc which are connected to the main control circuit 5 and the motor control circuit 61, respectively, and a grounded second terminal Tb.

A repeat/record switch 87 and a light-emitting diode 88 are connected to the main control circuit 5. The switch 87 is closed for starting repeat reproduction, for canceling this operation, for starting memory recording and for canceling this opeation. In response to the operation of the repeat/record switch 87, the main control circuit 5 feeds a control signal, changeable to a high level or low level, to the motor control circuit 61 via the pause switch 77.

As will be described later, the main control circuit 5 is adapted to produce a high-level control signal to the motor control circuit 61 with a delay of a predetermined time interval when the apparatus is changed over from usual reproduction to memory recording.

The light-emitting diode 88 is turned on with a high-level signal forwarded from the main control circuit 5 when the tape recorder is in repeat reproduction or memory recording operation.

The apparatus operates as follows for usual reproduction, repeat reproduction, usual recording, memory recording and a change from usual reproduction to memory recording.

Usual Reproduction Operation

In the stop mode, the first to fifth recording-reproduction change switches 8, 81, 82, 83 and 84 are closed at Tp, the control switch 76 is closed at Ta and the power control switch 64 is closed.

When the recorder is brought from this state into the reproduction mode by manipulating the operation panel, the power switch 65 is closed, thereby initiating the magnetic tape into travel.

The signal reproduced from the tape by the recording-reproduction head 41 is passed through the first recording-reproduction change switch 8, preamplifier 12, control switch 76, variable resistor 93 and reproduction amplifier 91 and applied to the speaker 9, which in turn produces a sound.

Repeat Reproduction Operation

Repeat reproduction is conducted by closing the repeat/record switch 87 after closing the second selection switch 75 at the second terminal Tc or third terminal Td in the usual reproduction mode.

When the second selection switch 75 is closed, for example, at the second terminal Tc, the first sound conversion circuit 21 and the memory circuit 3 are brought into operation under the control of the main control circuit 5, so that the data in the memory circuit 3 is renewed from address to address. The repeat/reproduction switch 87, when closed in this state, brings the main control circuit 5 into a control mode for repeat reproduction. Consequently, the control switch 76 is closed at Tb, and the output signal to the motor control circuit 61 changes from high level to low level, thereby opening the control switch 64 to deenergize the tape transport motor 62. Further the memory circuit 3 ceases its storing operation, permitting the stored signal to be read out repeatedly, with the second sound conversion circuit 22 in operation.

Consequently, the 8-second signal portion stored in the memory 3 is produced from the speaker 9 as a sound. During the repeat reproduction operation, the light emitting diode 88 goes on, manifestly indicating to the user that the tape recorder is in repeat reproduction operation.

When the repeat/record switch 87 is closed during repeat reproduction, the control switch 76 is closed alternatively at Ta, the output signal to the motor control circuit 61 changes to a high level to energize the tape transport motor 62, and the apparatus is restored to the usual reproduction mode.

When repeat reproduction is conducted with the second selection switch 75 closed at the third terminal Td, the memory circuit 3 is given a longer storage duration, realizing repeat reproduction with elongated cycles.

Usual Recording Operation

For usual recording, the tape recorder is set in the recording mode after closing the first and second selection switches 74, 75 at Tb as illustrated. Consequently, the power switch 65 is closed, initiating the magnetic tape into travel. At the same time, the first to fifth recording-reproduction change switches 8, 81, 82, 83 and 84 are closed at Tr.

The output signal from the microphone 11 is fed to the recording-reproduction head 41 via the first recording-reproduction change switch 8, preamplifier 12, recording amplifier 13 and first selection switch 74 for recording on the magnetic tape.

Memory Recording Operation

Memory recording is conducted by setting the tape recorder in the usual recording mode after closing the first and second selection switches 74, 75 at Td. This brings the main control circuit 5 into the control mode for memory recording, closing the control switch 76 at Tb and opening the power control switch 64.

Further the memory circuit 3 and the two sound conversion circuits 21, 22 are brought into operation under the control of the main control circuit 5, with the result that the output signal of the amplifier 12, as delayed by 8 seconds, is applied to the recording-reproduction head 41. At this time, the power control switch 64 is open, with the magnetic tape at rest, so that no signal is recorded on the tape.

If there is a speech portion desirable for noting down in this state during the conference, the repeat/record switch 87 is closed quickly, whereby the control switch 64 is closed to energize the tape transport motor 62, consequently driving the tape and causing the head 41 to record the signal on the tape. The signal recorded contains the signal portion emitted during the 8-second interval immediately prior to the closing of the switch 87 as in the case of the above embodiments. During recording, the light-emitting diode 88 goes on, indicating the recording operation.

When it becomes no longer necessary to record subsequent speech, the repeat/record switch 87 is opened about 8 seconds thereafter. This changes the signal to the motor control circuit 61, as well as to the diode 88, to a low level, stopping the tape. At the same time, the diode 88 turns off.

The memory recording operation can be realized with a longer delay time given to the memory circuit 3 when conducted with the second selection switch 75 closed at the third terminal Td.

Change from Usual Reproduction to Memory Recording

When the foregoing memory recording procedure is followed with the second selection switch 75 closed at Tc or Td and also with the tape recorder set in the reproduction mode, the main control circuit 5 is set in the control mode for memory recording, with the fifth recording-reproduction change switch 84 closed at the other terminal and with the repeat/record switch 87 operated. At this time, the control signal fed to the motor control circuit 61 from the main control circuit 5 is held at low level for 8 seconds after the procedure and then changed to high level. Accordingly, the magnetic tape is held at rest for the 8-second period without the sound signal stored in the memory circuit 3 during reproduction being recorded on the tape, as is the case with the second embodiment.

In the above usual recording or memory recording operation, the tape recorder can be temporarily held at a stop by closing the pause switch 77 at Tb.

The repeat/record switch 87 is not limited to a self-return switch but can be one which is retained in its closed position by depression.

Figure 5:
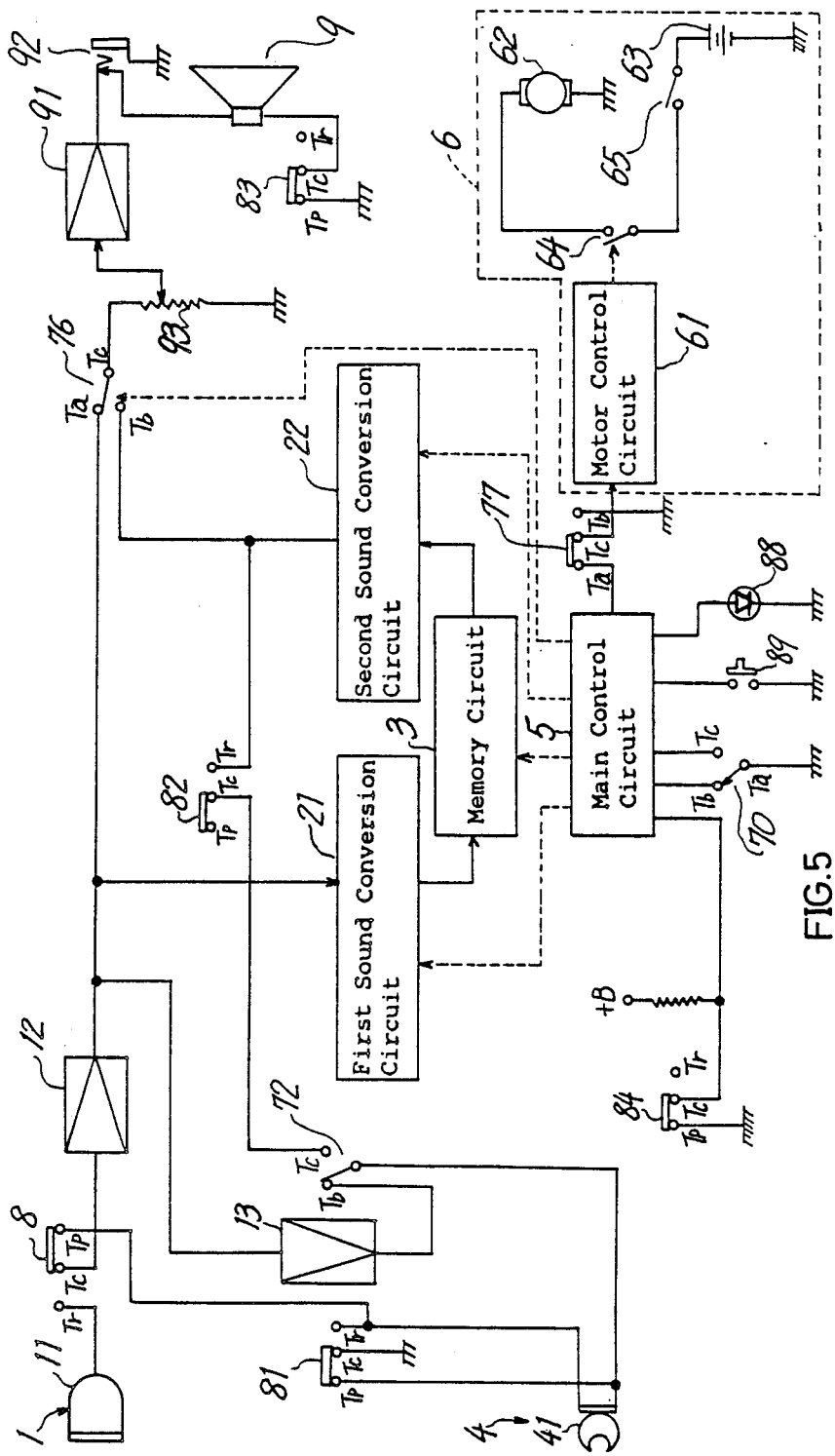
FIG. 5 is a block diagram showing a fourth embodiment of the invention.

(IV) Fourth Embodiment (FIG. 5)

The fourth embodiment is generally similar to the third embodiment in circuit construction with the exception of first and second selection switches 72, 70 having terminals Ta, Tb, Tc and substituting for the first and second selection switches 74, 75 shown in FIG. 4, an operation switch 89 in place of the repeat/record switch 87, and the control operation to be described below the main control circuit 5.

The output terminal of the reproduction amplifier 91 is provided with a jack 92 for inserting in an earphone or like plug.

The first and second selection switches 72, 70 are contemplated for repeat reproduction operation/-nonoperation change and for memory recording operation/nonoperation change. Each of these switches has a common terminal Ta, a first terminal Tb connectable to the common terminal Ta when the recorder is not in operation for repeat reproduction or memory recording, and a second terminal Tc connectable to to the common terminal Ta for repeat reproduction and memory recording operations.

The present embodiment operates as follows for usual reproduction, repeat reproduction, usual recording, memory recording, and a change from usual reproduction to memory recording. The same operation as that of the third embodiment will not be described.

Usual Reproduction Operation

The same as the third embodiment.

Repeat Reproduction Operation

For repeat reproduction, the second selection switch 70 is closed at Tc, and the operation switch 89 is then closed. The same operation as in the third embodiment thereafter follows.

Usual Recording Operation

For usual recording, the tape recorder is set in the recording mode after closing the first and second selection switches 72, 70 at Tb as illustrated. The same operation as in the case of the third embodiment then follows. When an earphone plug is inserted into the jack 92, the signal being recorded can be monitored through the earphone.

Memory Recording Operation

For memory recording, the recorder is set in the recording mode after closing the first and second selection switches 72,70 at Tc.

Consequently, the output signal of the amplifier 12, as delayed by 8 seconds, is applied to the recording-reproduction head 41 as a sound signal. The magnetic tape is held at rest at this time.

When there is a speech portion desirable to note down in this state during the conference, the operation switch 89 is closed. It is now assumed that T' is the period of time after the memory circuit 3 has been initiated into storing operation by closing the fifth recording-reproduction change switch 84 at Tr and closing the second selection switch 70 at Tc and until the operation switch 89 is closed. The period T' has the following relation with the storage duration T (8 seconds) of the memory circuit 3: $T' \geq T$, or $T' < T$. The subsequent operation will be described in respect of these cases.

(1) When $T' \geq T$

This is the case, for example, when the operation switch 89 is closed upon lapse of the time interval T (8 seconds) after the second selection switch 70 of the recorder in the usual recording operation has been closed at Tc.

When the operation switch 89 is closed in this case, the main control circuit 5 immediately feeds a signal of a high level to the motor control circuit 61, as well as to the light-emitting diode 88, whereupon the magnetic tape starts traveling to record thereon a sound signal delayed by the memory circuit 3.

(2) When $T' < T$

This is the case, for example, when the operation switch 89 is closed before the expiration of the time interval T (8 seconds) after the second selection switch 70 of the recorder, in the usual recording operation, has been closed at Tc.

The main control circuit 5 changes the control signal to the motor control circuit 61 from a low level to a high level a period of time (T - T') after the manipulation of the operation switch 89.

In this case, during the period (T - T'), a meaningless signal irrelevant to recording will be read out from the memory 3 after the manipulation of the switch 89, whereas the magnetic tape is at rest during this period, so that the meaningless signal will in no way be recorded on the tape.

Change from Usual Reproduction to Memory Recording

When the tape recorder in the reproduction mode with the second selection switch 70 closed at Tc is set for memory recording, the main control circuit 5 is set in the control mode for memory recording, with the fifth recording-reproduction change switch 84 changed over and with the manipulation of the operation switch 89.

When the change-over of the fifth recording-reproduction change switch 84 precedes the manipulation of the operation switch 89, a high-level signal is fed to the motor control circuit 61 to start memory recording, upon the lapse of the period (T - T') after the manipulation of the operation switch 89 if $T' < T$ as already stated, or simultaneously with the manipulation of the switch 89 if T'>T.

Further if the operation of the switch 89 precedes the change-over of the fifth recording-reproduction change switch 84, the high-level signal is given to the motor control circuit 61 for memory recording by the lapse of the period of time T (8 seconds) after the change-over of the switch 84.

Thus, the main control circuit 5 is so constructed that when the reproduction operation is directly changed over to the memory recording operation, the high-level signal is fed to the motor control circuit 61 at a time in accordance with the change. This prevents the meaningless signal stored in the memory circuit 3 in reproduction mode from being recorded on the tape.

Further when the signal delayed by the memory circuit 3 and being recorded is monitored during memory recording with an earphone by inserting its plug into the jack 92, the user can readily recognize when to manipulate the operation switch 89.

The construction of the apparatus of the invention is not limited to the foregoing embodiment but can be modified variously within the technical scope defined in the appended claims.

For example, the storage duration of the memory circuit 3 is easily variable by altering the capacity of the memory, sampling frequency, etc.

The present invention can of course be embodied not only as audio tape recorders but also as various other signal recording apparatus, such as video tape recorders and optical disc recorders.

When the present invention is embodied in digital audio tape recorders, the second sound conversion circuit 22 is omitted.

What is claimed is:

1. A signal recording apparatus having a signal recording medium drive system controllable for starting and stopping by the manipulation of a control portion, a signal recording head opposed to the signal recording medium to be transported by the drive system, a signal conversion circuit 2 connected to a record signal generator 1 for converting the record signal from the generator to a digital signal, a memory circuit 3 interposed between the conversion circuit 2 and the recording head 4 for temporarily storing the digital signal produced by the conversion circuit 2, and a main control circuit 5 for controlling the memory circuit 3 for storing the signal therein and reading out the signal therefrom, the apparatus being characterized in that the main control circuit 5 has connected thereto an operation switch 7 serving as the operation portion and being provided with a timer circuit 51 for setting a time delay D approximately equal to or longer than a storage duration T of the memory circuit 3, the digital signal being continuously stored in the memory circuit 3 and being continuously read out therefrom as delayed from the storing time by the storing duration T and fed to the recording head 4, and when a recording-stop instruction is given by the operation switch 7, the main control circuit 5 feeds a stop instruction to the drive system 6 with the time delay D.

2. A signal recording apparatus having a signal recording medium drive system controllable for starting and stopping the by manipulation of a control portion, a signal recording-reproduction head opposed to the signal recording medium to be transported by the drive system, a signal conversion circuit 2 connected to a record signal generator 1 for converting the record signal from the generator to a digital signal, a memory circuit 3 interposed between the conversion circuit 2 and the recording-reproduction head 41 for temporarily storing the digital signal produced by the conversion circuit 2, and a main control circuit 5 for controlling the memory circuit 3 for storing the signal therein and reading out the signal therefrom, the apparatus being characterized in that one of the signal generator 1 and the signal recording-reproduction head 41 is selectively connected to the conversion circuit 2 via a recording-reproduction change switch 8, the main control circuit 5 including a timer means for setting a time interval approximately equal to or longer than a storage duration T of the memory circuit 3, and a control switch 79 operable by the main control circuit 5 is provided between the output terminal of the memory circuit 3 and the recording-reproduction head 41, a reproduced signal being feedable from the recording-reproduction head 41 to an external output device via the conversion circuit 2 and the memory circuit 3 in a signal reproduction mode, the control switch 79 being closable by the main control circuit 5 to thereby apply the record signal to the recording-reproduction head 41 upon lapse of the time interval when the signal reproduction mode is changed to a signal recording mode.

3. A signal recording apparatus having a signal recording medium drive system controllable for starting and stopping by the manipulation of a control portion, a signal recording-reproduction head opposed to the signal recording medium to be transported by the drive system, a signal conversion circuit 2 connected to a record signal generator 1 for converting the record signal from the generator to a digital signal, a memory circuit 3 interposed between the conversion circuit 2 and the recording-reproduction head 41 for temporarily storing the digital signal produced by the conversion circuit 2, and a main control circuit 5 for controlling the memory circuit 3 for storing the signal therein and reading out the signal therefrom, the apparatus being characterized in that one of the signal generator 1 and the signal recording-reproduction head 41 is selectively connected to the conversion circuit 2 via a recording-reproduction change switch 8, the main control circuit 5 including a timer means for setting a time interval approximately equal to or longer than a storage duration T of the memory circuit 3, a reproduction signal being feedable from the recording-reproduction head 41 to an external output device via the conversion circuit 2 and the memory circuit 3 in a signal reproduction mode, and the main control circuit 5 gives a start instruction to the drive system 6 upon lapse of the time interval when the signal reproduction mode is changed to a signal recording mode.

4. A signal recording apparatus having a signal recording medium drive system controllable for starting and stopping by the manipulation of a control portion, a signal recording head opposed to a the signal recording medium to be transported by the drive system, a signal conversion circuit 2 to a record signal generator 1 for converting the record signal from the generator to a digital signal, a memory circuit 3 interposed between the conversion circuit 2 and the recording head 4 for temporarily storing the digital signal produced by the conversion circuit 2, and a main control circuit 5 for controlling the memory circuit 3 for storing the signal therein and reading out the signal therefrom, the apparatus being characterized in that the main control circuit 5 has connected thereto an operation switch 89 to be manipulated when giving a start instruction to the drive system 6, the main control circuit 5 including a timer means for counting up a period of time T' after the memory circuit 3 has been initiated into storing operation and until the manipulation of the operation switch 89, and the main control circuit 5 feeds the start instruction to the drive system immediately after the manipulation of the operation switch 89 when the period of time T' is not smaller than the storage duration T of the memory circuit 3, or feeds the start instruction to the drive system 6 upon lapse of a period of time (T - T') after the manipulation of the operation switch 89 when T' is smaller than T.

* * * * *